(No Model.) 2 Sheets—Sheet 1.
W. HAMMERMILLER.
MACHINE FOR CLEANING AND SORTING FEATHERS.
No. 280,371. Patented July 3, 1883.
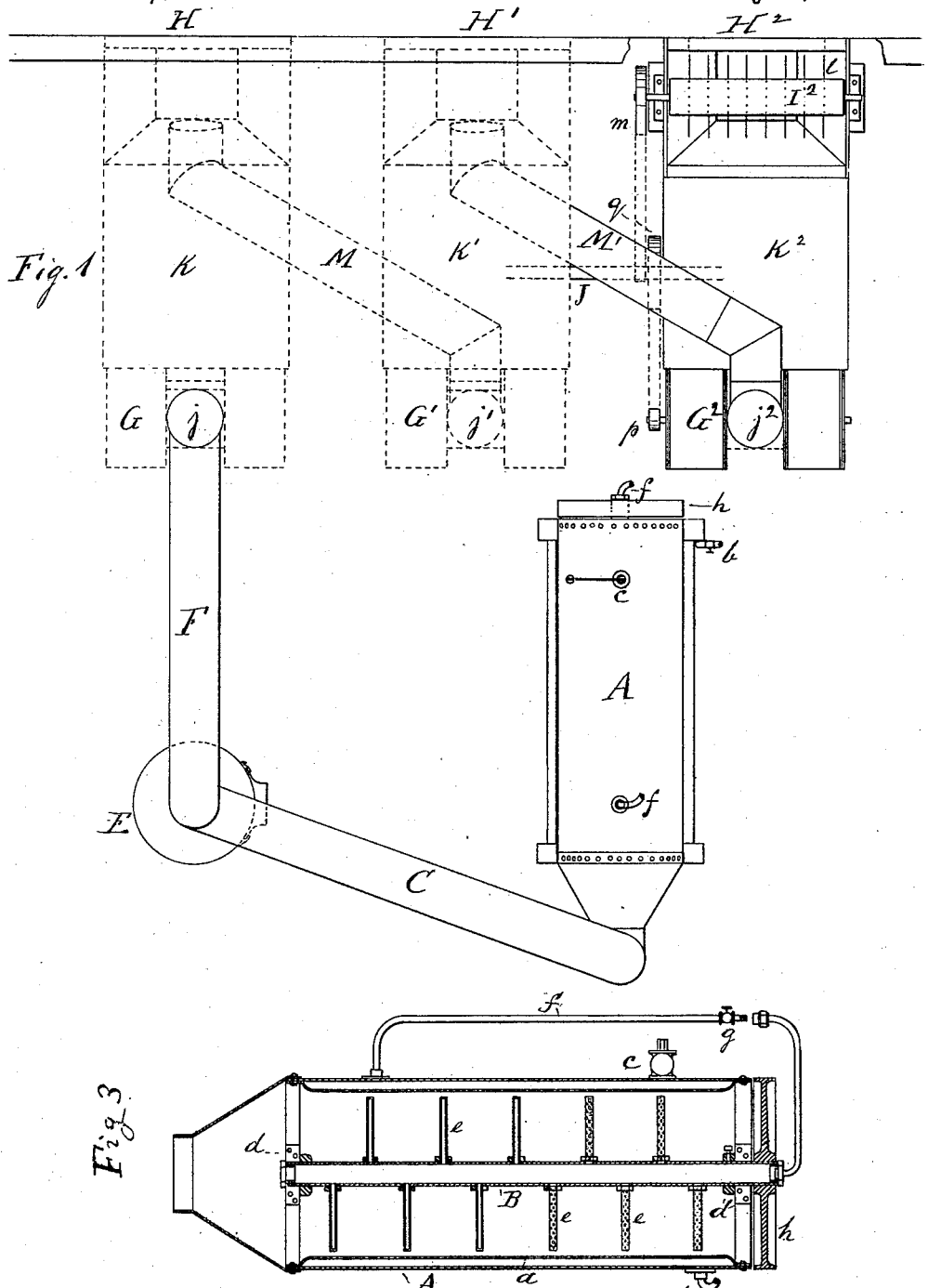
WITNESSES:
INVENTOR
William Hammermiller
BY Wm H Lotz
ATTORNEY

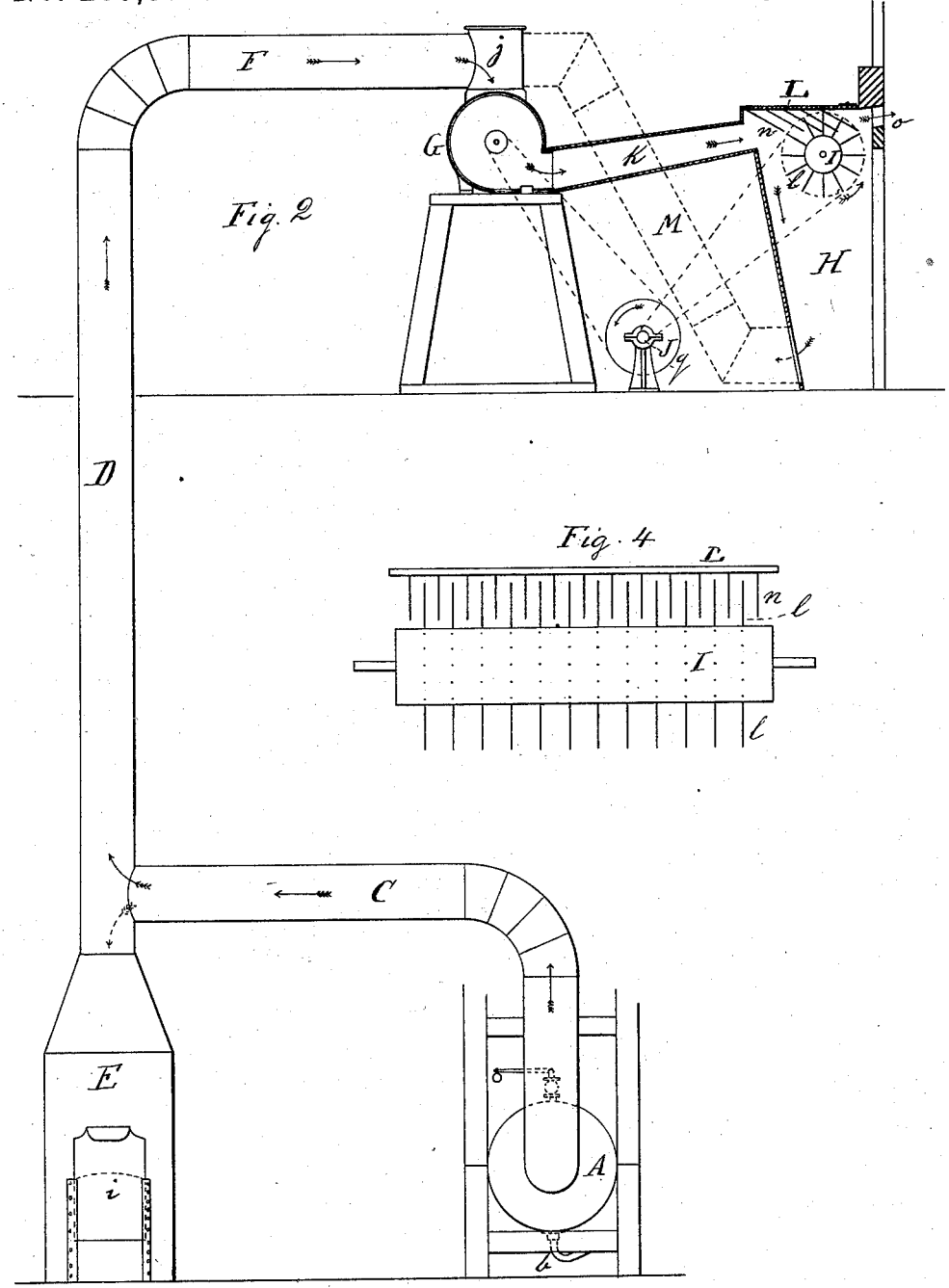

UNITED STATES PATENT OFFICE.

WILLIAM HAMMERMILLER, OF CHICAGO, ILLINOIS, ASSIGNOR TO CHARLES EMMERICH & CO., OF SAME PLACE.

MACHINE FOR CLEANING AND SORTING FEATHERS.

SPECIFICATION forming part of Letters Patent No. 280,371, dated July 3, 1883.

Application filed April 4, 1883. (No model.)

*To all whom it may concern:*

Be it known that I, WILLIAM HAMMERMILLER, a citizen of the United States of America, residing at Chicago, in the county of Cook and State of Illinois, have invented certain new and useful Improvements in Machines for Cleaning and Sorting Feathers, of which the following is a specification, reference being had therein to the accompanying drawings.

This invention has for its object to produce an apparatus in which the feathers, by means of steam, are first purified and scalded, and then by a blast and pickers are sorted according to their specific gravity; and it consists of the novel device and combinations of devices hereinafter described and specifically claimed.

In the drawings, Figure 1 represents a plan view, and Fig. 2 a sectional elevation, of the entire apparatus; Fig. 3, a longitudinal vertical section of the cylinder for loosening, drying, and scalding the feathers; and Fig. 4, an elevation of the rotary picker.

Corresponding letters in the several figures of the drawings designate like parts.

A denotes a cylinder, that is open at both ends and has a circumferential jacket, $a$, into which live steam is admitted from the boiler through a pipe, $b$, and that is provided with a safety-valve, $c$.

B is a hollow shaft arranged axially in cylinder A, and journaled in suitable bearings, $d$ $d'$. This hollow shaft B is provided with radial hollow arms $e$, that are closed at their ends, and are each perforated with a series of small holes. The rear end of shaft B is closed, while its front end, by means of a coupling-nut, is loosely connected with the steam-jacket $a$ by a pipe, $f$, that has a stop-valve, $g$. In this manner the exhaust-steam from jacket $a$ can be circulated through shaft B and discharged through the small holes of arms $e$ whenever it is desirable to do so. Upon the forward end of shaft B is mounted a pulley, $h$, for driving it by a belt. The rear end of cylinder A is conically contracted to couple with an elbow-pipe, C, that rectangularly connects with an upright pipe, D. This pipe D, below its junction with pipe C, is connected with an upright cylindrical chamber, E, that has a sliding door, $i$. The upper end of pipe D, by a curved elbow, is coupled with horizontal pipe F, leading into the vacuum-chamber $j$ of a double suction-fan, G, the discharge-spout K of which leads into the side of a chamber, H, near the top of the same.

The drum I has spikes or wires $l$ radially secured upon its surface, that are placed in circumferential rows of equal distance apart, to form the picker. The shaft of this drum I is journaled in suitable boxes secured to the sides of chamber H, and its projecting end has mounted thereon a pulley, $m$, for driving the drum by a belt from counter-shaft J. The radial wires $l$ of drum I alternate with rows of wires $n$, that are rigidly secured to a top plate, L, and are rearwardly inclined. This top plate, L, is hinged to chamber H, to open like a lid whenever necessary for inspection or repairs. The spout K of fan G, that leads into chamber H, points toward the space where the wires $l$ of drum I interlap the stationary and inclined wires $n$ of plate L, and in the side of chamber H opposite to such spout K, and in line therewith, is provided an opening, $o$, that is in line with such spout K. In the bottom of chamber H is an opening, that, by a pipe, M, connects with the vacuum-chamber $j'$ of suction-fan G', which, through a spout, K', leads into chamber H', that has picker I', and from the bottom of chamber H' again leads a pipe, M', into vacuum-chamber $j^2$ of fan G$^2$, that again, through spout K$^2$, discharges into chamber H$^2$, &c., the several sets of exhaust-fans and chambers with pickers being of uniform construction, and any necessary number of them may be applied, to be fed one with the refuse from the other. Each fan has a pulley, $p$, and is driven by a belt from a pulley, $q$, mounted upon counter-shaft J.

The operation of the apparatus is as follows, to wit: By the motion of fans G a partial vacuum is created in pipes F, D, and C, that produces a draft through such pipes and through cylinder A. Feathers being placed in front of such cylinder A will be drawn into and through such cylinder by such draft, where, by the rotation of arms $e$, such feathers are separated, are cleaned and purified by the steam escaping through the perforations of the arms $e$, and are dried and scalded by the heat of the steam in jacket $a$ and in shaft B.

Thence passing through pipe C into pipe D at a right angle, the feathers strike against the wall of such pipe D, when the heaviest feathers, as well as all clogging dirt and soil that were in the feathers, will drop into chamber E, to be removed from time to time through door $i$. The lighter material will be drawn upward through pipes D and F into fan G, and will be blown against the inclined wires $n$ and the upper wires, $l$, of picker I, that slowly rotates in the direction shown by arrow, when the light and good quality feathers will pass between the wires $l$ and $n$ and through opening $o$ into a large room, where the best quality having the least specific gravity will be carried by the air-current the greater distance, and the inferior qualities a proportional less remote distance, and will thus sink to the floor in a sorted condition. The heavy or larger kind of feathers and feathers adhering thereto, and therefore not in the condition to pass through the interstices between wires $l$ and $n$, will be carried back and downward by wires $l$, rotating with drum I, and will drop into the bottom of chamber H, whence, by the suction of fan G', they will be drawn through pipe M and blown into chamber H', to go through the same evolution, and so on through the several fans and pickers until all the better quality feathers have been separated from the coarse or large feathers and have been sorted according to degree of quality.

For regulating the draft in pipes D and C the door $i$ may be opened more or less.

The wires $n$ being inclined, all feathers too large for passing between them will slide down thereon upon drum I, between wires $l$, and such wires $l$, being in a constant rotation, will remove such feathers, to drop into the bottom of chamber H, and will thus keep the interstices between wires $n$ and $l$ from being choked up.

What I claim is—

1. In a machine for cleaning and sorting feathers, the stationary cylinder A, having steam-jacket $a$, and rotating shaft B, with radial arms $e$, such cylinder being connected with exhaust-fan G and chamber E by pipes C and D, substantially in the manner and for the purpose set forth.

2. In a machine for cleaning and sorting feathers, the fan G, connecting by spout K with chamber H, that is provided with stationary inclined wires $n$, with rotating drum I, having radial wires $l$, and with discharge-opening $o$, all constructed and arranged to operate substantially as set forth.

3. In a machine for cleaning and sorting feathers, a series of fans, G G' G$^2$, each connected through a spout, K, with a chamber, H H' H$^2$, that is provided with wires $n$, and drum I, with wires $l$, the bottom of chamber H being connected again with the suction-chamber of fan G' by pipe M, and the bottom of chamber H' again being connected with the suction-chamber of fan G$^2$ by a pipe, M', all constructed and arranged substantially as set forth, for the purpose specified.

4. In a machine for cleaning and sorting feathers, the cylinder A, having steam-jacket $a$, and shaft B, with radial arms $e$, and being connected with fan G and chamber E by pipes C D F, and such fan again being connected by spout K with chamber H, that has inclined wires $n$, drum I, with radial wires $l$, and discharge-opening $o$, all constructed and arranged substantially as set forth, to operate as specified.

In testimony whereof I affix my signature in presence of two witnesses.

WILLIAM HAMMERMILLER.

Witnesses:
LOUIS NOLTING,
ADAM GEO. WHITE.